United States Patent Office 3,441,943
Patented Apr. 29, 1969

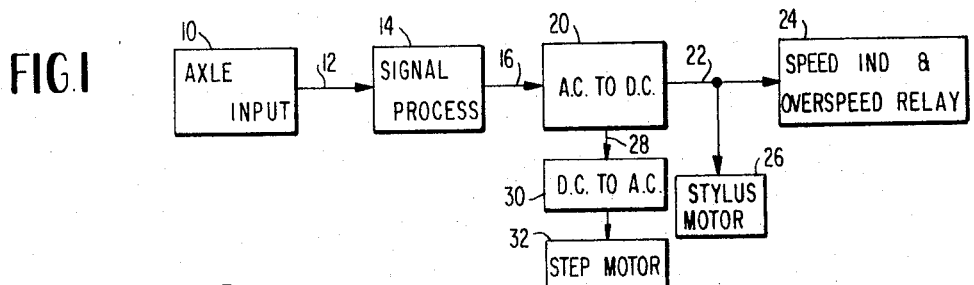
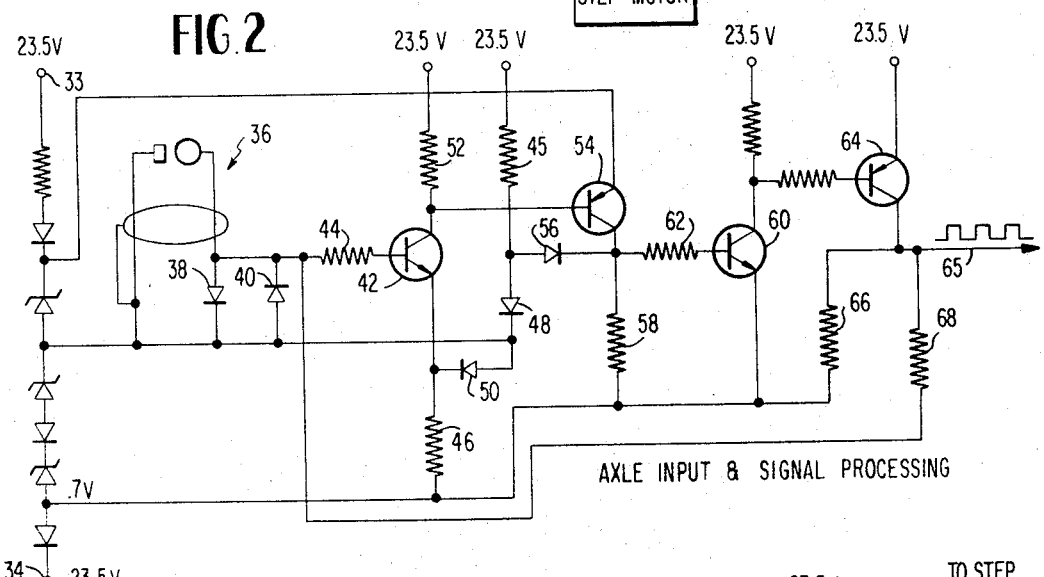
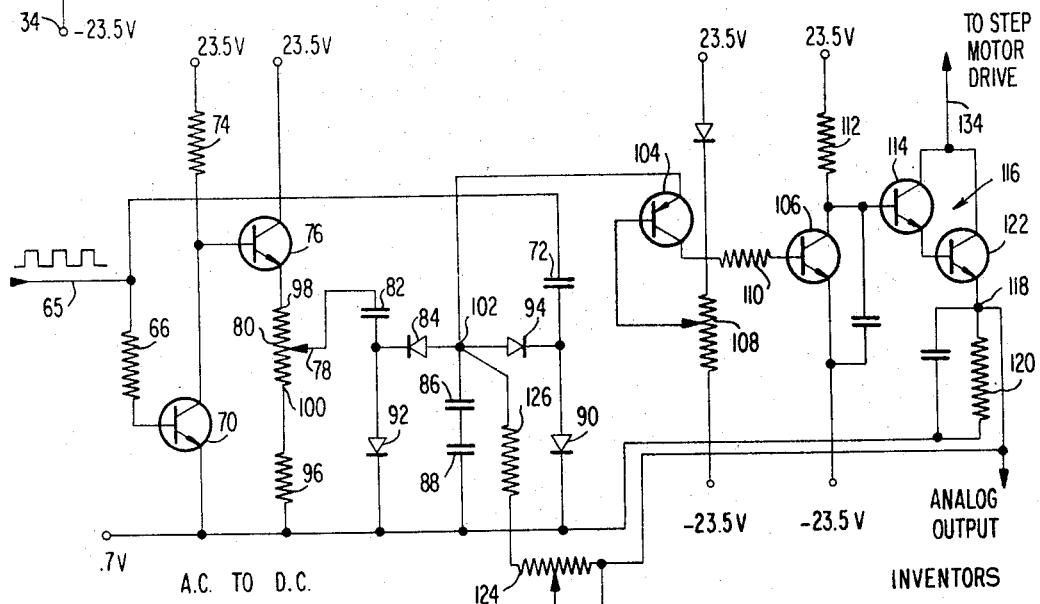
INVENTORS
THOMAS A. BRENDLE
DAVID D. McCUE
BY
Bean & Bean
ATTORNEYS

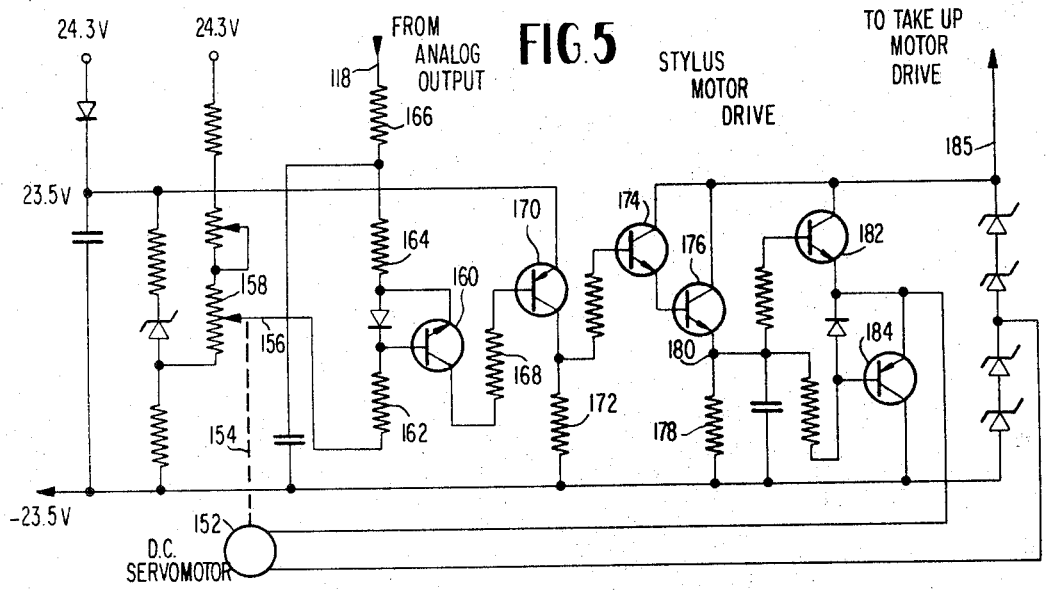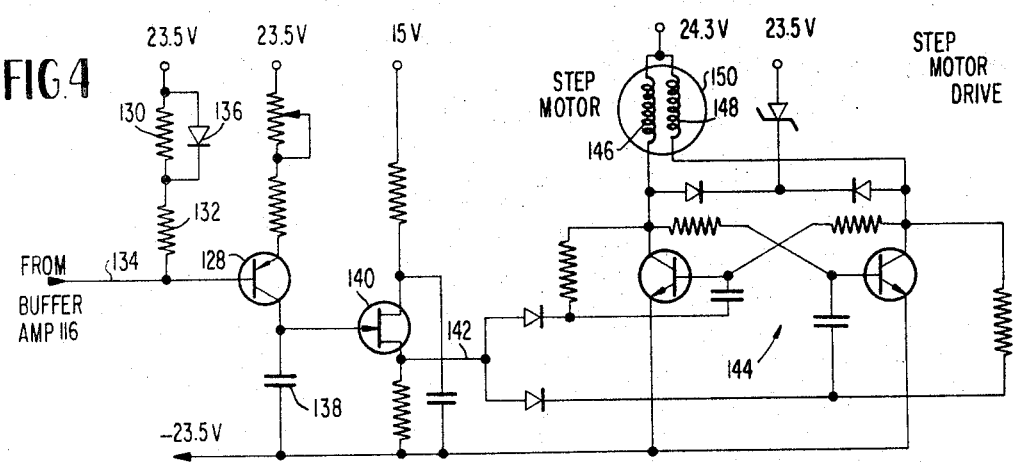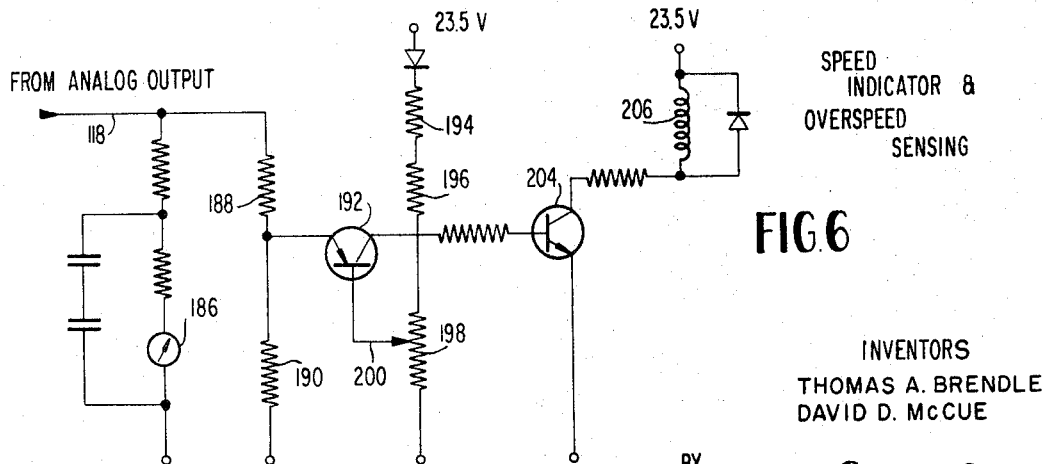

3,441,943
LOCOMOTIVE RECORDING SYSTEM
David D. McCue and Thomas A. Brendle, Hamburg, N.Y., assignors to Aeroquip Corporation, Jackson, Mich.
Filed Dec. 4, 1967, Ser. No. 687,588
Int. Cl. G01d 9/26
U.S. Cl. 346—33                                  6 Claims

ABSTRACT OF THE DISCLOSURE

A system for recording conditions or events incidental to the operation of a locomotive. Locomotive speed is measured on the basis of signal frequency converted to an analog signal for visual speed indication and to a lower frequency for driving a record paper supply, the analog signal also being used to drive a stylus motor for recording speed on the record paper.

Brief summary of the invention

The invention involves a system as described in which a locomotive wheel rotation transducer provides an input signal having a frequency proportional to locomotive speed, this signal being then processed to produce a square wave signal at the transducer frequency. The squared signal is first converted to an analog signal for operating a visual speed indicator and a stylus motor for recording speed, and' is reconverted to a lower frequency signal for driving the record paper associated with the stylus.

The squaring device uses an avalanche type of amplifier and negative feedback, producing an output independent of noise input and stable as to its triggering point.

The A.C. to D.C. conversion circuit employs a dual diode pump arrangement connected to a high gain amplifier with negative feedback to produce an output whose voltage level is proportional to the frequency of the squared input signal regardless of loading on the amplifier.

Brief description of the drawings

FIGURE 1 is a block diagram illustrating the various component portions of the system; and
FIGURES 2–6 are circuit diagrams illustrating certain portions of the system according to the block diagram of FIGURE 1.

Detailed description of the invention

The general assembly is shown in FIGURE 1 wherein it will be seen that the speed transducer is in the form of an axle input indicated generally by the reference character 10 and the signal therefrom at 12 whose frequency and amplitude is a function of speed is applied to a signal processing unit 14 having an output at 16 which is a function of frequency only, being directly proportional to speed, and this frequency signal is applied to an A.C. to D.C. conversion circuit 20 from whence, at 22, the D.C. signal is fed to a speed indicator and overspeed relay circuit 24. The signal at 22 is also applied to a stylus servomotor as indicated by the reference character 26 which serves to record the speed on a suitable recording sheet. The recording sheet is moved at a speed proportional to the analog output at 28, this signal being fed to a D.C. to A.C. conversion unit as indicated generally by the reference character 30 and from there to a stepping motor 32. The conversion from A.C. to D.C. and then back to A.C. effects a frequency reduction for driving the stepping motor 32.

The above described system functions permanently to record the speed of the locomotive as established by the mechanism 12 on a sheet of recording paper wherein the abscissa is a function of distance travelled and the ordinate is the speed of the locomotive, the stylus motor 26 establishing movement of the stylus to effect the reading on the ordinate whereas the step motor 30 provides movement of the paper along the abscissa.

The axle input and signal processing units are shown more particularly in FIGURE 2 wherein it will be seen that a stable voltage point is established between the points 33 and 34, the transducer being shown generally by the reference character 36. The transducer 36 is in the form of a pickup associated with a toothed or gear device driven by the locomotive wheel with there being a predetermined number of teeth associated with the wheel so as to produce a frequency and amplitude indicative of vehicular speed. The generally sinusoidal signal produced by this transducer, which may be of any conventional form, is clipped by the diodes 38 and 40 and this signal is applied to the base of the transistor device 42, through the resistor 44. The emitter of the semiconductor device 42 is biased via resistors 45 and 46 and the associated isolating diodes 48 and 50 whereby fluctuations across the load resistor 52 are applied directly to the base of the semiconductor device 54 so that the two transistors 42 and 54 operate in avalanche fashion in response to the clipped sinusoidal input. Diode 56 is provided for isolation and voltage fluctuations across the load resistor 58 due to the aforesaid avalanche action are applied to the base of the semiconductor device 60 by means of the resistor 62. The devices 60 and 64 constitute an amplifier pair having an output at 65 across the load resistor 66 which is of fixed amplitude but of a frequency proportional to locomotive speed.

Negative feedback is applied from the output 65 through the resistor 68 to the input resistor 44. This feedback serves two purposes, first to render the squaring device independent of noise input and second to provide means to adjust the triggering point with respect to the clipped sinusoidal input.

The squared output at 65 is applied to the conversion circuit shown in FIGURE 3 across the resistor 66 to the base of the semiconductor device 70 and simultaneously to the capacitor 72. The increasing signal at the base of the device 70 causes an increase in collector current across the load resistor 74 and a corresponding decreasing signal at the base of the semiconductor device 76. The resultant decreasing voltage at the movable tap 78 of the potentiometer 80 transfers charge on the capacitor 82 through the diode 84 to the capacitor means 86, 88. At the same time, the capacitor 72 is charged through the diode 90.

During negative-going signals, the capacitor 82 is charged through the diode 92 while the capacitor 72 transfers charge through the diode 94. Since the squaring circuit in FIGURE 2 produces an output whose frequency is proportional to locomotive speed, the charge transfer to the capacitor means 86, 88 is also proportional to locomotive speed. To compensate for variation in driving wheel diameter from a locomotive to locomotive, the potentiometer-resistor combination 80, 96 is used. The values for the potentiometer 80 and the resistor 96 are chosen so that when the tap 78 is at the end point 98, the capacitor 82 will charge to the maximum and while at the point 100, will charge to the minimum. Thus, the charge transfer in the first case will be greater than in the second case, the condition necessary to establish identical charge transfer for the first case in which a large wheel diameter produces a fixed speed frequency which is lower than the fixed speed frequency for the smaller wheel (the second case), the fixed speed being the same in both cases.

The output at 102 of the dual diode pump just described is connected to the emitter of the semiconductor device 104 which, together with the semiconductor device 106, forms a high gain amplifier. The base bias on the device 104 is adjusted by means of the potentiometer 108 such that the device 104 is always slightly conducting. As the level of the output point 102 tends to increase, the collector current of the device 104 through the load resistor 110 tends to increase causing a corresponding decrease of collector current through the load resistor 112 of the device 106. An increasing signal is thus applied to the base of the first NPN device 114 of the emitter-follower buffer amplifier 116. The output at point 118 is taken across the load resistor 120 connected to the emitter of the semiconductor device 122 of the buffer-amplifier pair 114, 112. Negative feedback is taken from the output 118 through the resistor chain 124, 126 to the output point 102 of the dual diode pump, the resistor 124 being adjustable to allow range changes to be made easily.

With the arrangement shown, the high gain amplifier wants to see zero input and the voltage at the output 118 is proportional to the frequency of the input at 65 regardless of the loading on the amplifier. To achieve this, it forces its output voltage level to the exact level required to produce a current through its feedback resistor exactly equal to but of opposite polarity to that deposited by the diode pump.

The step motor drive is shown in FIGURE 4 and the base of the semiconductor device 128 will be seen to be biased through the resistors 130 and 132 in accord with the operation of the buffer amplifier 116 of FIGURE 3 since the collectors of the buffer amplifier are connected through lead 134 to the voltage source through these resistors. The resistor-diode combination 130, 136 is provided for temperature compensation.

The capacitor 138, then, acts as an integrator discharging through the semiconductor device 140 so that the sawtooth voltage output at 142 controls the bistable multivibrator designated generally by the reference character 144 in such fashion as alternately to energize the coils 146 and 148 of the step motor device 150.

FIGURE 5 illustrates the circuitry associated with the D.C. servomotor 152 which controls movement of an associated stylus. The stylus motor is connected as indicated by the dashed line 154 to the movable tap 156 of the position feedback potentiometer 158. The base of the semiconductor device 160 is thus biased through the resistor 162 in accord with the potential existing at the movable tap 154 of the feedback potentiometer. The emitter of the device 160 is connected through the resistor chain 164, 166 to the analog output 118 of the FIGURE 3 conversion unit and the collector current of the device 160 is connected through the resistor 168 to the base of the semiconductor device 170 so that the output of the amplifier pair 160, 170 is taken across the load resistor 172. This output is applied to the base of the first semiconductor device 174 of the buffer-amplifier pair 174, 176 and the output of this pair is taken across the load resistor 178.

The level of the output at 180 establishes the states of conduction for the two semiconductor devices 182 and 184. These devices may be in one of three conditions, both off, one on and the other off or vice versa, the first condition prevailing when the servomotor 152 has positioned tap 156 in null position.

The conductor 185 leads to a takeup motor (not shown) the purpose of which is to maintain the record paper in taut condition.

The speed indicator 186 is shown in FIGURE 6 and is connected, as shown, to the output 118 of the analog signal. This output is also connected through the resistor chain 188, 190 to the emitter of a transistor 192 whose base is biased through the resistor chain 194, 196, 198 and adjusted through the movable tap 200 of the resistor 202 to respond to some analog voltage value at 118 corresponding to a predetermined high speed to turn on the transistor 204 sufficiently to actuate the coil 206 of the relay switch by means of which a record of exceedingly predetermined high speed is established.

The movable tap 200 for the overspeed relay 206 as well as the movable tap 78 for wheel diameter compensation are manually adjusted and sealed in adjusted position as is explained in our copending application filed concurrently herewith.

We claim:

1. In a system for recording conditions incidental to the operation of a locomotive, in combination,
   transducer means associated with a member driven with a locomotive wheel for producing an input signal having a frequency proportional to locomotive speed,
   signal processing means for squaring said input signal,
   conversion means for converting said squared signal to an analog signal proportional to the frequency of said input signal,
   a D.C. servomotor driven by said analog signal to move a stylus according to locomotive speed,
   means for converting said analog signal to a pulse signal having a frequency related to but lower than the frequency of said input signal,
   and a record paper drive motor controlled by said pulse signal.

2. The system according to claim 1 wherein said signal processing means includes a pair of semiconductor devices one of which has an input connected to said transducer means and the other of which is connected in avalanche fashion to said one semiconductor device, a buffer amplifier connected to the output of said other semiconductor device, and negative feedback means connecting the output of said buffer amplifier to the input of said one semiconductor device.

3. The system according to claim 2 wherein said conversion means includes an amplifier connected to said squared signal, a first capacitor connected to the output of said amplifier, a second capacitor connected to said squared signal, the capacitors being charged in push-pull relation, capacitor means, first diode means providing a separate charging path for said first capacitor and a path discharging to said capacitor means, second diode means providing a separate charging path for said second capacitor and a path discharging to said capacitor means, a high gain amplifier connected to said capacitor means, and a positive feedback connection from the output of said high gain amplifier to said capacitor means.

4. The system according to claim 3 including a potentiometer for varying the charging level of said first capacitor in accord with the diameter of the locomotive driving wheel.

5. The system according to claim 1 wherein said conversion means includes an amplifier connected to said squared signal, a first capacitor connected to the output of said amplifier, a second capacitor connected to said squared signal, the capacitors being charged in push-pull relation, capacitor means, first diode means providing a separate charging path for said first capacitor and a path discharging to said capacitor means, second diode means providing a separate charging path for said second capacitor and a path discharging to said capacitor means, a high gain amplifier connected to said capacitor means, and a positive feedback connection from the output of said high gain amplifier to said capacitor means.

6. The system according to claim 5 including a potentiometer for varying the charging level of said first capacitor in accord with the diameter of the locomotive driving wheel.

References Cited

UNITED STATES PATENTS 2,342,687   2/1944   Parrish _____ 346—118

RICHARD B. WILKINSON, *Primary Examiner.*

JOSEPH W. HARTARY, *Assistant Examiner.*

U.S. Cl. X.R.

324—70; 346—118